(12) United States Patent
O'Gorman (10) Patent No.: US 9,021,062 B2
(45) Date of Patent: Apr. 28, 2015

(54) SHARING AUDIO AND VIDEO DEVICE ON A CLIENT ENDPOINT DEVICE BETWEEN LOCAL USE AND HOSTED VIRTUAL DESKTOP USE

(75) Inventor: Liam Patrick O'Gorman, Co. Limerick (IE)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 13/600,904

(22) Filed: Aug. 31, 2012

(65) Prior Publication Data

US 2014/0068007 A1  Mar. 6, 2014

(51) Int. Cl.
*G06F 15/16* (2006.01)
*H04L 12/18* (2006.01)
*H04N 7/14* (2006.01)
*H04N 7/15* (2006.01)

(52) U.S. Cl.
CPC ............ *H04L 12/1818* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 8,234,332 B2 | 7/2012 | Jaudon et al. | |
| 2003/0169285 A1* | 9/2003 | Smith et al. | 345/716 |
| 2010/0231754 A1* | 9/2010 | Wang et al. | 348/231.99 |
| 2010/0274841 A1 | 10/2010 | Jaudon et al. | |
| 2011/0107331 A1 | 5/2011 | Evans et al. | |
| 2011/0110505 A1* | 5/2011 | Arthur et al. | 379/93.21 |
| 2012/0131377 A1 | 5/2012 | Baird et al. | |
| 2013/0148493 A1* | 6/2013 | Keenan et al. | 370/225 |
| 2013/0339451 A1* | 12/2013 | Nyberg et al. | 709/204 |

* cited by examiner

*Primary Examiner* — Nicholas Taylor
*Assistant Examiner* — Clayton R Williams
(74) *Attorney, Agent, or Firm* — Edell, Shapiro & Finnan, LLC (57) ABSTRACT

A communication is established between a client device and a server device, where the server device executes one or more hosted virtual desktop (HVD) applications for the client device. A media data stream including at least one of audio content and video content is transmitted from the client device to the server device, where audio and video content of the media data stream is captured by one or more input devices at the client device and is utilized by an HVD application at the server device. In response to a request for the media data stream by a second application that is local to the client device or is operating at a remote device, transmission of the media data stream to the server device is selectively suspended or shared with the second application.

23 Claims, 8 Drawing Sheets

SHARING AUDIO AND VIDEO DEVICE ON A CLIENT ENDPOINT DEVICE BETWEEN LOCAL USE AND HOSTED VIRTUAL DESKTOP USE

TECHNICAL FIELD

The present disclosure relates generally to Unified Communications (UC), and more particularly to operations at a client endpoint device that occur during use of UC application by the client device.

BACKGROUND

The field of Unified Communications (UC) is a growing technology that unifies various forms of human communication via a device into a common user experience. Unified Communications can integrate real-time communications services such as instant messaging and presence, telephony, and video conferencing with other communications services such as voicemail, email, facsimile, and short messaging services.

Unified Communications can also be virtualized, where a UC application can run in a hosted virtual desktop (HVD) while the user interface for the application is displayed on a remote client endpoint (e.g., thin client) device. A virtual desktop infrastructure (VDI) supports the interactions between the HVD and the client endpoint device.

In a typical VDI deployment, one or more locally connected universal serial bus (USB) audio and video devices (e.g., a microphone and camera) are utilized with the HVD for use in windows and/or other types of applications in the virtual environment. Some non-limiting examples of applications utilized at the HVD include real-time communication applications such as Skype, Cisco Unified Personal Communicator, WebEx, GotoMeeting, etc. and also recording applications such as Camtasia, Photobooth, movie maker applications, dictation software, etc. Typically, the audio and video devices at the remote client endpoint are permanently redirected and thus locked by the VDI protocol client running on the remote endpoint client device, such that the audio and video devices are not available for use any another application or service locally at the client device.

In contrast, when using the audio/video devices for local UC applications by the client device (e.g., running real-time voice/video sessions directly at the client endpoint device), the audio and video devices are locked for such local use and cannot be used for applications by the HVD. This problem can be exacerbated in scenarios in which the audio/video devices are already locked by the HVD even when they are not actively being used. There is further no easy mechanism for detecting and arbitrating between the HVD and a local UC stack.

DESCRIPTION OF EXAMPLE EMBODIMENTS

Overview

Techniques and corresponding systems are provided herein for establishing a communication between a client device and a server device, wherein the server device executes one or more hosted virtual desktop (HVD) applications for the client device. A media data stream comprising at least one of audio content and video content is transmitted from the client device to the server device, where audio and video content of the media data stream is captured by one or more input devices at the client device and is utilized by an HVD application at the server device. In response to a request for the media data stream by a second application that is local to the client device or is operating at a remote device, transmission of the media data stream to the server device is selectively suspended or is shared with the second application.

Example Embodiments

As described herein, a client device (e.g., a thin client) including audio and video devices (e.g., camera and microphone) for capturing audio and video content provide such audio and video content, via its local UC protocol stack, to a hosted virtual desktop (HVD) server for use by HVD applications requiring such audio and video content. The HVD host server executes HVD applications on behalf of the client device, such that processing of the HVD applications are handled by the HVD host server while access and control of functions or features of executed HVD applications can be provided by the client device. Control of the audio and video devices is further maintained locally by the local UC protocol stack, so as to enable the client device to share captured audio and video content with other computing devices while using such HVD applications (e.g., sharing audio and video content with a remote party device when the client device receives a call request from the remote party device). The client device, via its local UC protocol stack and virtual desktop interface (VDI) with the host HVD server device, can also temporarily disrupt or suspend the transmission of audio and video content for use by any running HVD applications while such content is being provided to another remote party device (e.g., during a call with the remote party device). This can be achieved without any changes to the HVD application or applications being run at the HVD server device.

Figure 1:
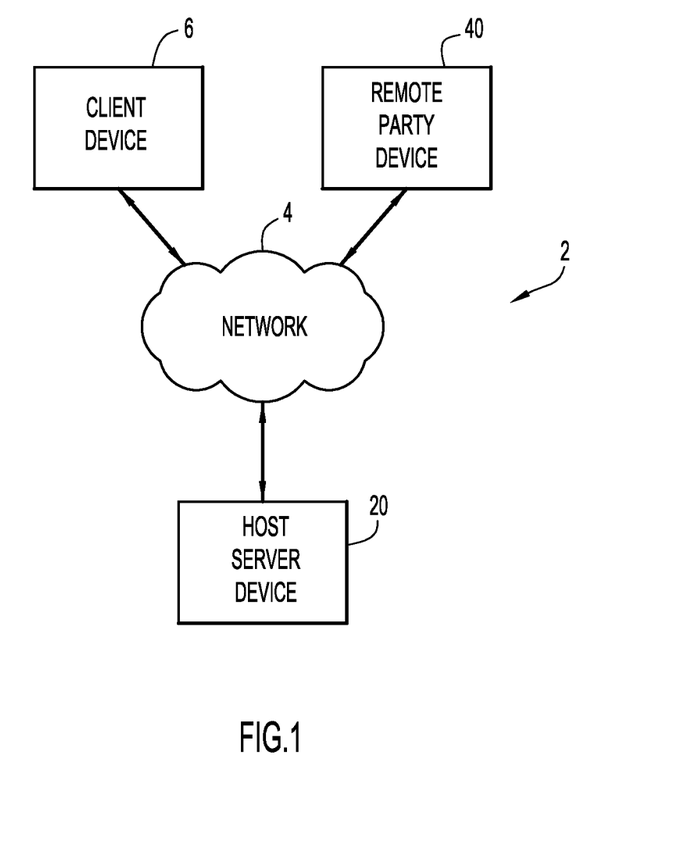
FIG. 1 is a block diagram showing an example embodiment of a system comprising a UC environment in which UC connectivity can be established between a client device, a hosted virtual desktop (HVD) server and a remote party device.

Referring to FIG. 1, a block diagram is shown for an example system 2 that supports operation of HVD applications at one or more host server devices 20 for use by client devices 6. The client devices 6 communicate with server devices 20 over a network 4, where the network 4 facilitates communications and exchange of information between computing devices such as a client device 6 and a server device 20 (e.g., data streams including audio and video media streams captured by a computing device for transmission to one or more other computing devices as described herein). A single client device 6 and a single host server device 20 are depicted in FIG. 1 for example purposes only, and it is noted that the system 2 can include any suitable number of client devices 6 which connect with any suitable number of host server devices 20 to establish a HVD session in which HVD applications are supported by the host server(s) 20 for use and operation by the client devices (e.g., individual use of HVD applications by each client device as well as collective use by two or more client devices for certain types of HVD applications). In addition, a client device 6 can also establish a connection, via the network 4, with any one or more remote party devices 40 to communicate and exchange information (including data streams such as audio and video media streams as described herein) during such connection. A single remote party device 40 is also depicted in FIG. 1 for example purposes, and it is noted that the system 2 can include any suitable number of remote party devices.

Examples of types of networks that can be utilized within system 2 include, without limitation, any one or more of local or wide area networks, Internet Protocol (IP) networks such as intranet or internet networks, telephone networks (e.g., public switched telephone networks or PSTNs), wireless or mobile phone or cellular networks, and any suitable combinations thereof. Any hardware and/or software can be utilized within the network 4 to facilitate communication of information between two or more computing devices over the network. Examples of hardware that can be utilized within the network include, without limitation, routers, hubs, switches, gateways, or any other suitable components in any suitable form or arrangement. The various computing devices, including the client devices 6, host servers 20 and remote party devices 40, can include any conventional or other communications devices to communicate over the network 4 via any conventional or other protocols, and can further utilize any type of connection (e.g., wired, wireless, etc.) for accessing the network. In addition, any suitable call agents or media gateway controllers can also be provided within the network 4 to facilitate a UC call (e.g., a communication including audio and/or video content) and other types of UC communications (e.g., instant messaging, voicemail, email, and gateways for PSTN, facsimile, and short messaging services) between two or more devices within the system 2.

Figure 2:
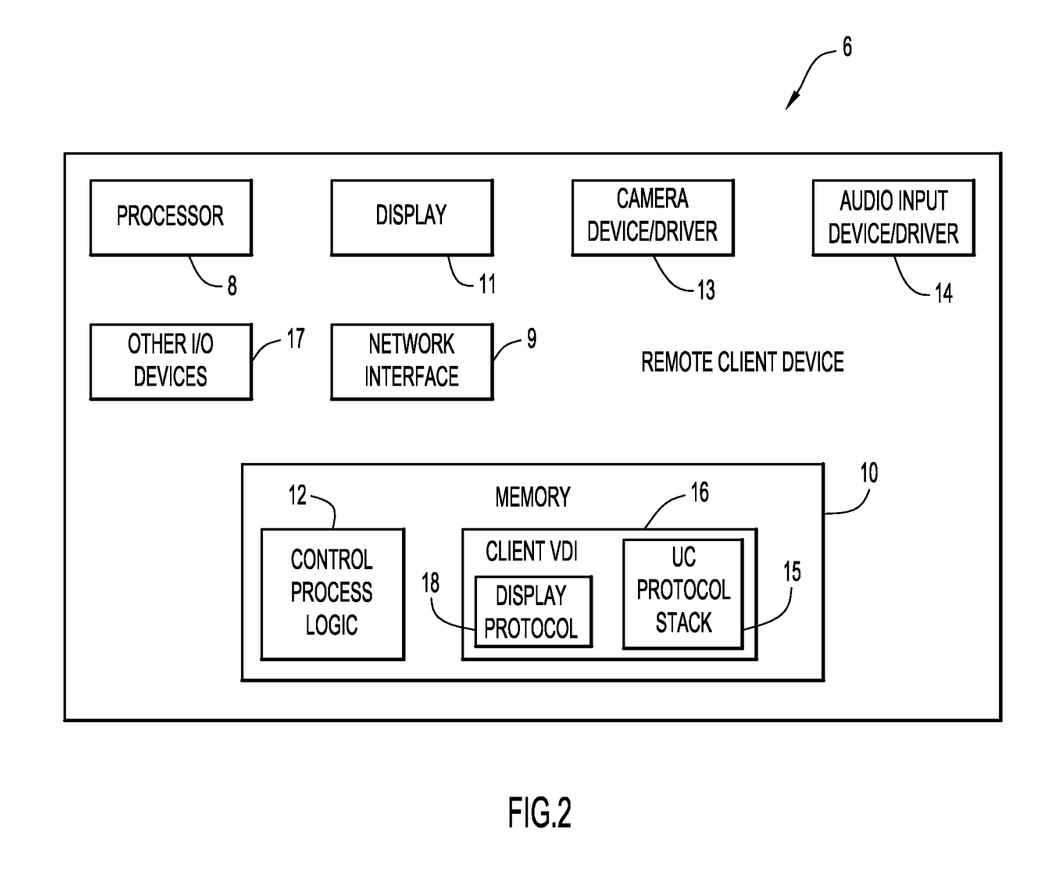
FIG. 2 is a block diagram showing an example embodiment of a client device for the system of FIG. 1.
Figure 3:
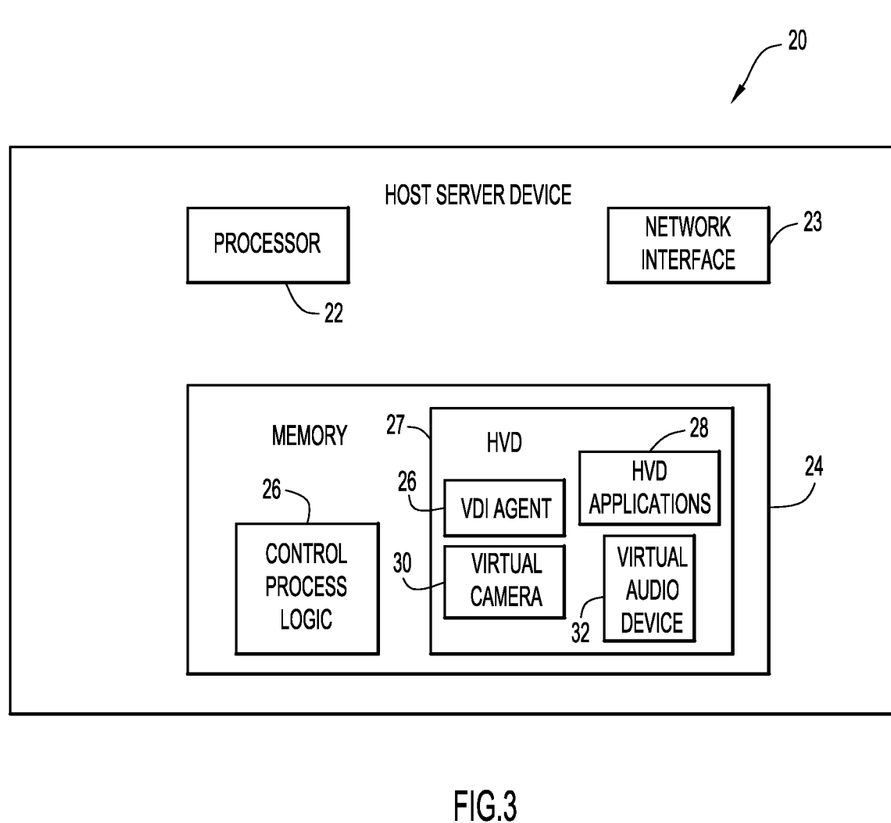
FIG. 3 is a block diagram showing an example embodiment of a HVD server for the system of FIG. 1.

Referring to FIGS. 2 and 3, each client device 6 includes at least one processor 8, a network interface 9, a memory 10, and a display 11. Similarly, each host server device 20 includes a processor 22, a network interface 23, and memory 24. Each processor 8, 22 can be implemented, for example, as a microprocessor, microcontroller, system on a chip (SOCs), or other fixed or programmable logic. The functions of the processors 6, 22 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), where the memories 10, 24 each store data used for the computations or functions described herein (and/or to store software or processor instructions that are executed to carry out the computations or functions described herein). Alternatively, one or more computer readable storage media are provided and encoded with software comprising control process logic instructions 12, 26 stored within the memories 10, 24 of the devices 6, 20. The control process logic instructions 12, 26 include operational instructions executed by the processors to perform the techniques described herein. Thus, functions of the process logic as described herein can be implemented with fixed logic or programmable logic (e.g., software or computer instructions executed by a processor or field programmable gate array (FPGA)).

The network interfaces 9 and 23 of the computing devices 6 and servers 20 can be, for example, one or more of an Ethernet interface card or switch, a modem, a router or any other suitable hardware device that facilitates a wireless and/or hardwire connection over the network 4 with one or more servers 20 and other devices, where each network interface unit can be integrated within the device or a peripheral that connects with the device.

The memories 10, 24 for the client and server devices can be implemented by any conventional or other memory or storage device, and may include any suitable storage capacity. For example, each memory 10, 24 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 10, 24 may comprise one or more computer readable storage media (e.g., a memory device) encoded with software comprising computer executable instructions as described herein such that, when the software is executed (by processor 8, 22), it is operable to perform the operations described herein in connection with FIG. 8.

Each client device 6 can be any conventional or other computing device, such as a thin client, computer terminal or workstation, personal desktop computer, laptop or netbook, tablet, cellular phone, or other device capable of acting as a client in the described system. The client device 6 can be used alone, or in conjunction with an optional telephony device, which may be, for example, a telephony headset, plain old telephone system (POTS) device, cellular phone, private branch exchange (PBX) device, or any other suitable telephony device. Each remote party device 40 can also be any of the types of devices as described for the client devices 6.

Each host server device 20 can be, for example, a computing blade, a blade server comprising one or more solid state drives, or a blade center comprising one or more blade servers together with a blade chassis comprising common resources such as networking connections, input/output device connections, power connections, cooling devices, switches, etc. A host server device 20 can be a component of a larger system, such as a Cisco Unified Computing System, or a data center that centralizes enterprise computing resources.

Each client device 6 includes a display device 11 as well as other input and output devices, and the client device communicates with these devices in any suitable manner, e.g., via a wired or wireless connection. The display device 11 may be any suitable display, screen or monitor capable of displaying information to a user of a client endpoint device, for example the screen of a tablet or the monitor attached to a computer workstation. The end party devices can also include any suitable display device for displaying video content provided by a client device (e.g., during a video call).

Each client device 6 (and, optionally, each server device 20 and each remote party device 40) can include any other suitable input or output devices integrated with the devices and/or any other types of peripheral devices that can be connected with the devices to facilitate input or output of audio, video or other information between a user and the client endpoint device (e.g., keyboards, mouse devices, cameras, microphones, touch screens, trackpad, remote control devices, headphones, speakers, etc.) to facilitate input, output or display of audio, video and/or other types of information to the user utilizing the client device.

In particular, a client device 6 includes a camera device 13 (with corresponding driver software, where the camera driver software can be stored, e.g., by memory 10) and a microphone or other audio input device 14 (with corresponding driver software that can be stored, e.g., by memory 10). Other input and output devices (e.g., speakers, keyboard, mouse device, remote control devices, etc.) are generally depicted in FIG. 2 as other I/O devices 17. Each of the camera device 13 and audio input device 14 can be integrated as part of the client device 6 (e.g., built in components of the device 13) or, alternatively, as peripheral components that connect with the client device 6 in any suitable manner (e.g., via a USB input connection). A host server device 20 includes a virtual camera application 30 and a virtual audio input device application 32 stored by memory 24, where the applications 30, 32 are configured to process audio and video data streams received by the host server device 20 from a client device 6 in order to utilize audio and video content captured at the client device 6 by the camera and audio input devices 13, 14 for HVD applications at the server device 20 as described herein. In particular, the virtual camera application 30 receives a video component of the media data stream while the virtual audio input device application 32 receives an audio component of the media data stream provided by the UC protocol stack 15 to the HVD module 27, where the virtual camera application 30 provides video content in its original captured format (i.e., in the same or similar format as captured by camera 13) and the virtual audio input device application 32 provides audio content in its original captured format (i.e., in the same or similar format as captured by the audio input device 14) for use by HVD applications 28 so as to simulate that audio and video content are being captured by the HVD module 27 at the host server device 20.

FIGS. 4-7 are example block diagrams depicting the virtual desktop interface (VDI) between a client device 6 and a host server device 20 and also the UC protocol stack at the client device 6 which controls operations and flow of the audio and video media streams associated with content captured by the camera device 13 and the audio input device 14. For purposes of simplification, other components of the client device 6 and host server device 20 are not shown in these figures.

Figure 4:
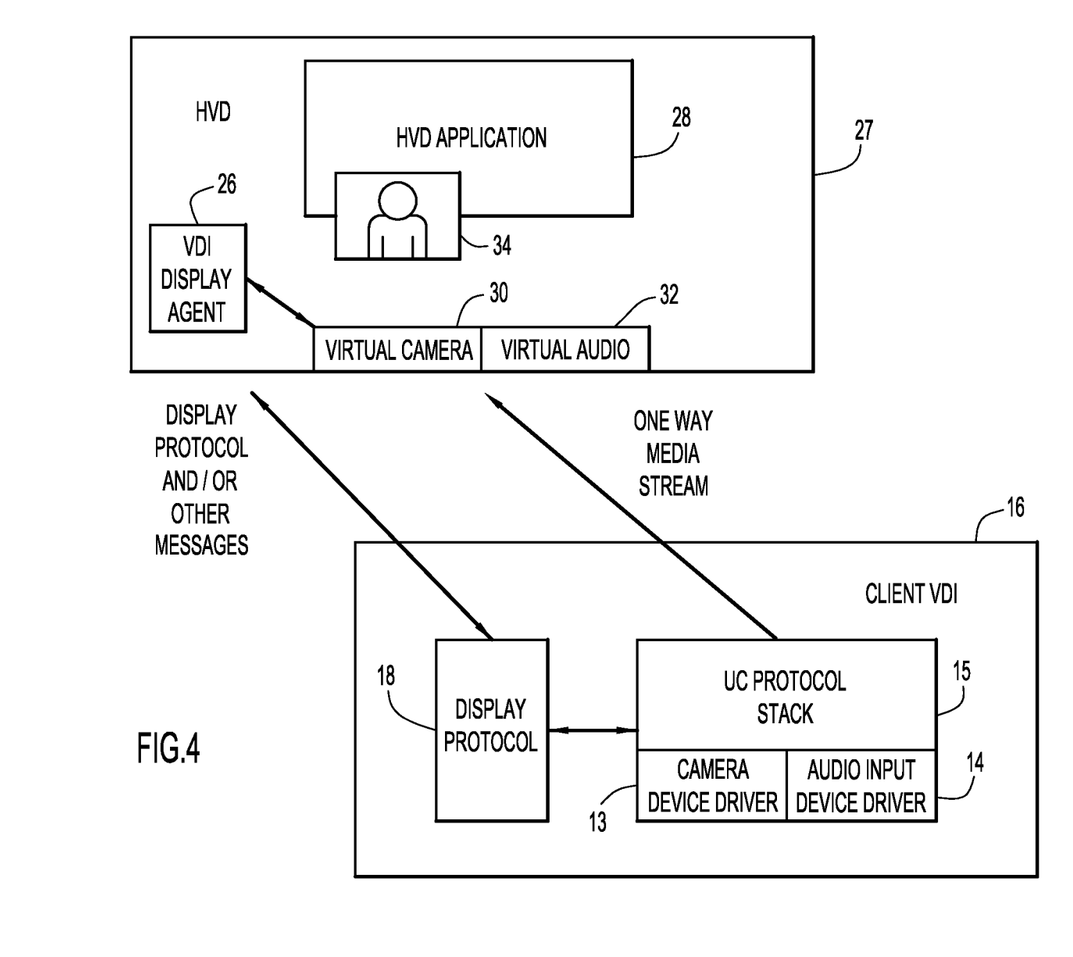
FIG. 4 is a schematic block diagram showing the interaction between the client virtual desktop interface (VDI) and client UC protocol stack of the client device and the server VDI of the host server device during a session in which audio and video captured by the client device is shared for HVD applications.

Referring to FIGS. 2-4, the client device 6 includes a client VDI module 16 including one or more software applications that provide an interface for communicating with a host server device 20 to facilitate control and operation of HVD applications 28 within an HVD module 27 stored by the host server memory 24. For example, the VDI module 16 includes a display protocol application 18 that is operated and controlled by a UC protocol stack 15 of the client device 6, where the display protocol application communicates with a VDI agent 26 of the HVD module 16 for the host server device 20.

The UC protocol stack 15 of the client device 6 controls UC operations of the client device, including call control operations and control of media streams associated with audio and video content captured by the camera device (and associated driver) 13 and audio input device (and associated driver) 14. For example, the UC protocol stack 15 controls the receipt of calls from and communications with an end party device 40, including providing media data streams from the client device 6, including audio and/or video content (by controlling the camera and audio input drivers), to such end party device 40. The UC protocol stack 15 also controls transmission of media data streams including audio and video content to the virtual camera 30 and audio input device 32 of the HVD module 27.

The media data in a data stream can be encoded or compressed in any suitable manner (e.g., using UC voice and video codecs) and via any suitable protocol (e.g., using Real-time Transport Protocol or RTP or User Datagram Protocol or UDP) that is capable of being received, decoded/decompressed and processed in any other suitable manner by the endpoint device (i.e., by the virtual camera 32, virtual audio input device 32 and/or the HVD module 16 at a host server 20 and/or at an end party device 40). Encoding of the media stream can be implemented directly by the camera device and/or audio device (and associated drivers) of the client device 6. For example, the camera device 13 and audio device 14 can encode the media stream utilizing H.264/MPEG-4 AVC (advanced video coding) techniques and/or any other suitable encoding techniques to encode video and audio portions of the media stream, where the encoded media stream is then provided by the camera and audio devices to the UC protocol stack 15 for delivery to the HVD module 27. The HVD module 27 then decodes the media data stream into a format (e.g., MPEG or raw YUV) for use by the HVD application running at the host server device 20. Alternatively, the camera device 13 and audio device 14 can provide the media stream to the UC protocol stack 15 in their native (non-encoded) formats, where encoding of the media stream then occurs at the UC protocol stack 15 (e.g., utilizing one or more encoding/decoding applications of the UC protocol stack) prior to being delivered to the HVD module 27 at the host server device 20.

The UC protocol stack 15 of the client device 6 communicates with the HVD module 27 of the host server device 20 via one or more applications, including the display protocol application 18. For example, when a particular HVD application 28 is selected for use by the client device 6, the UC protocol stack 15 provides instructions to the HVD module 27 and this application 28 is opened or activated at the host server device 20. Examples of HVD applications which use audio and/or video content from the client device 6 during operation of the application include, without limitation, real-time communication applications (e.g., Skype, Cisco Unified Personal Communicator, WebEx, GotoMeeting, etc.), and audio/video recording applications (e.g., Camtasia, Photobooth, movie maker applications, dictation software, etc.). When an HVD application 28 is activated that uses audio and/or video content from the client device 6, instructions regarding use of the camera device 13 and/or audio input device 14 at the client device 6 are communicated between the VDI display agent 26 and the display protocol application 18, where the instructions include a display protocol message (as well as other communication messages, as needed) associated with operation of the HVD application 28. Based upon the exchange of message information between the UC protocol stack 15 and the HVD module 27 via the display protocol application 18 and the VDI display agent 26, the VDI display agent 26 activates the virtual camera and audio input devices 30, 32 for use with the HVD application 28. The media content received and utilized by the host server device 20 and remote party device 40 is generally depicted as content 34 in FIGS. 4-7. The UC protocol stack 15 of the client device 6 sends a one way media data stream (e.g., a point-to-point RTP stream) comprising audio and/or video content to the HVD module 27 of the host server device 20 for use by the virtual camera and audio input devices 30, 32, as shown in FIG. 4, so as to facilitate use of such content by the HVD application 28. Continued operation and de-activation or closing of the HVD application 28 can also occur via communications between the client VDI module 16 (e.g., via communications between the display protocol application 18, as controlled by the UC protocol stack 15, and the VDI display agent 26) and HVD module 27.

Figure 5:
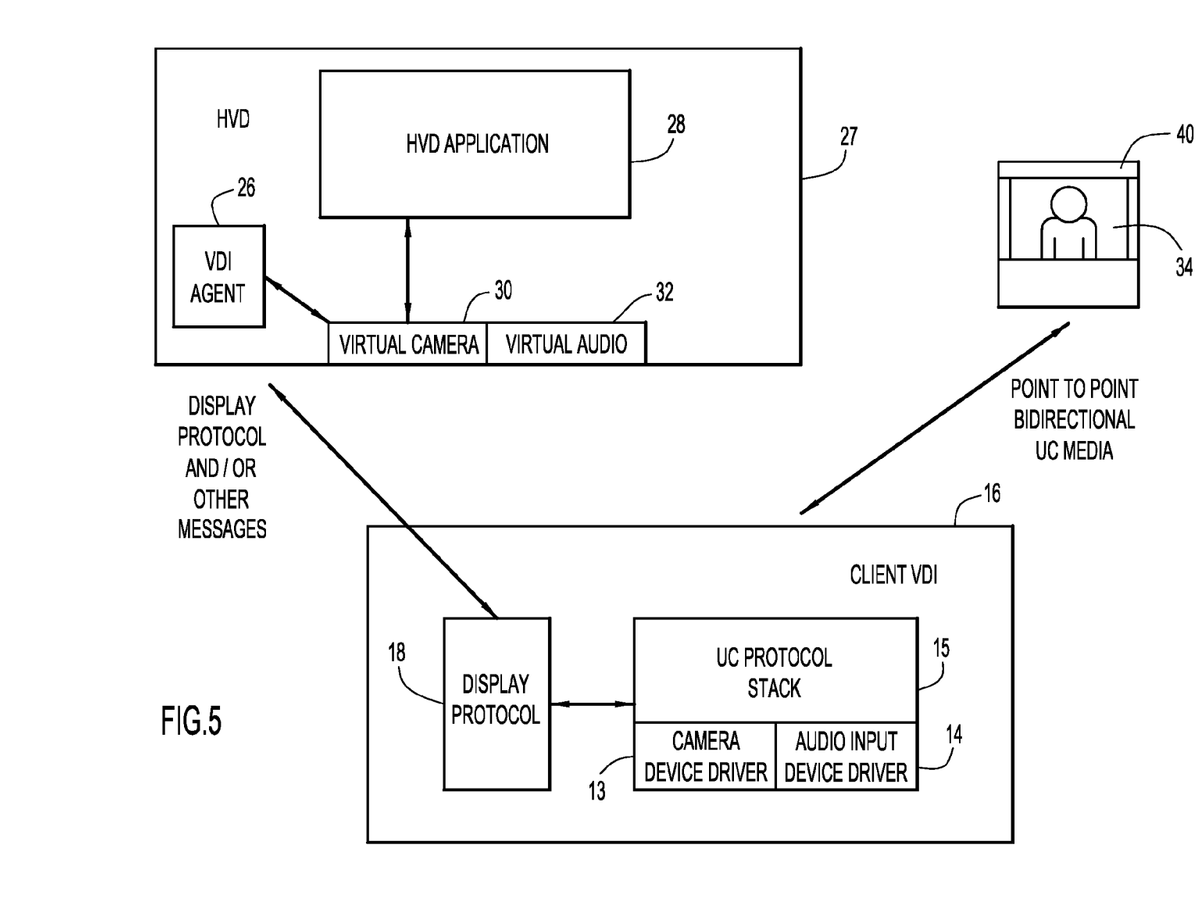
FIG. 5 is a schematic block diagram showing the interaction between the client UC protocol stack and a remote party endpoint device in a call in which audio and video captured by the client device is shared only with the remote party device.

Referring to FIG. 5, a remote party device 40 has established a connection with the client device 6 (which is facilitated by the UC protocol stack 15) such that a bi-directional UC media data stream including audio and/or video content (e.g., an RTP data stream) can be exchanged between the devices. In other words, the client device 6 provides audio and/or video content to and also receives audio and/or video content from the remote party device 40. In this scenario, the HVD application 28 may not use audio or video content from the client device 6 (e.g., the HVD application does not need any audio or video content to be provided by the client device 6 during a particular session, or there is a period in which there is a pause in the requirement by the HVD application for an audio and video stream from the client device). Thus, the camera and audio input devices 13, 14 of the client device 6 are available or free for use only in relation to the connection between the client device 6 and the remote party device 40.

Figure 6:
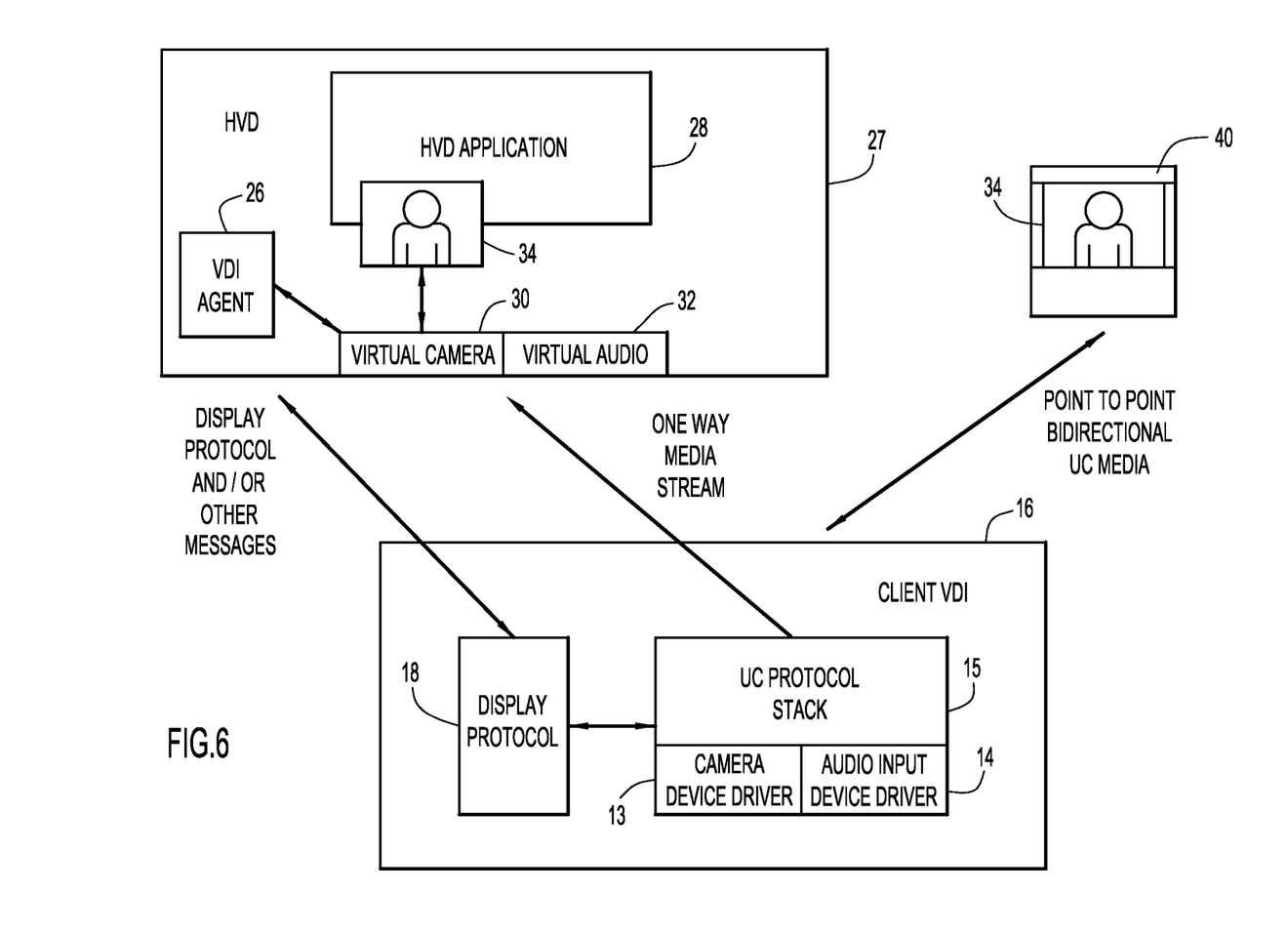
FIG. 6 is a schematic block diagram showing interactions between the client virtual desktop interface (VDI) and client UC protocol stack of the client device, the server VDI of the host server device and the remote party device in which audio and video captured by the client device is shared with the HVD server device for HVD applications as well as the remote party device.
Figure 7:
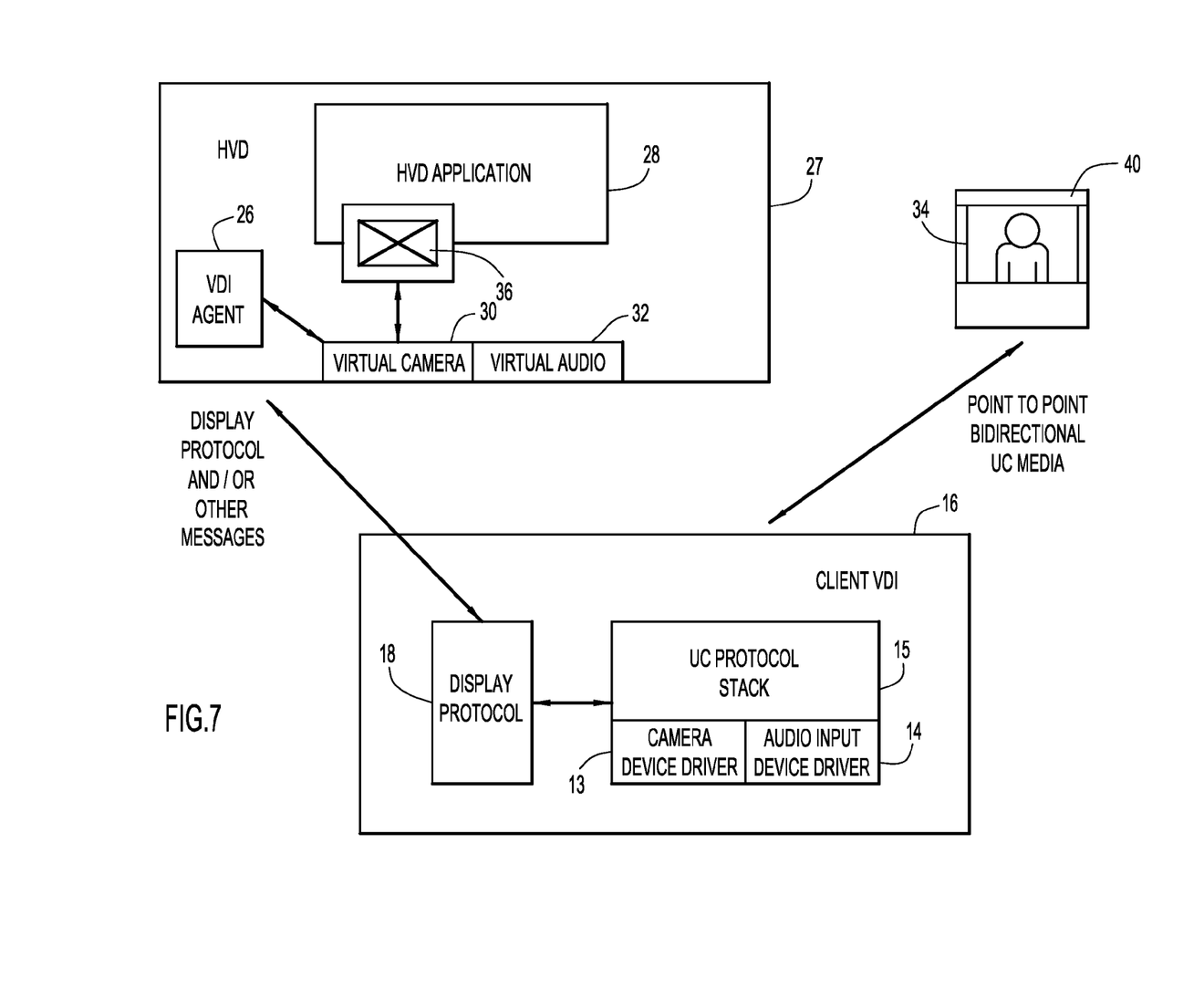
FIG. 7 is a schematic block diagram showing interactions between the client virtual desktop interface (VDI) and client UC protocol stack of the client device, the server VDI of the host server device and the remote party device in which audio and video captured by the client device is temporarily disrupted to the HVD server while being shared with the remote party device.

The UC protocol stack 15 maintains exclusive control over the camera device 13 and audio input device 14. This is important for scenarios in which an HVD application is activated that uses a media stream comprising audio and/or video content from the client device 6 and the client device simultaneously uses the same audio and/or video content for one or more other applications local to the client device. For example, in the embodiments depicted in FIGS. 6 and 7, the client device 6 receives an incoming call from a remote party device 40 while providing a media stream comprising audio and video content to the host server device 20 for use by the virtual camera and audio devices 30, 32 in relation to an activated/running HVD application 28. By maintaining control of the camera and audio input devices 13, 14 by the local UC protocol stack 15, and further by implementing appropriate protocols via the display protocol application 18, the client device 6 controls transmissions of the media stream to one or more end point devices based upon a priority associated with each endpoint device or a particular application currently requiring the audio and video content at any given time. As described herein, the UC protocol stack 15 can choose to either fork or split the media stream into a plurality of streams for transmission to different end point devices (e.g., splitting the stream for simultaneous transmission to both the host server device 20 and the remote party device 40 as depicted in FIG. 6) or selectively transmit the media stream to one or more but not all of the end point devices requesting such media stream (e.g., briefly disrupting or pausing transmission of the media stream to the host server device 20 and diverting such media stream to the remote party device 40 while the call between remote party device and the client device 6 is active, as depicted in FIG. 7).

Figure 8:
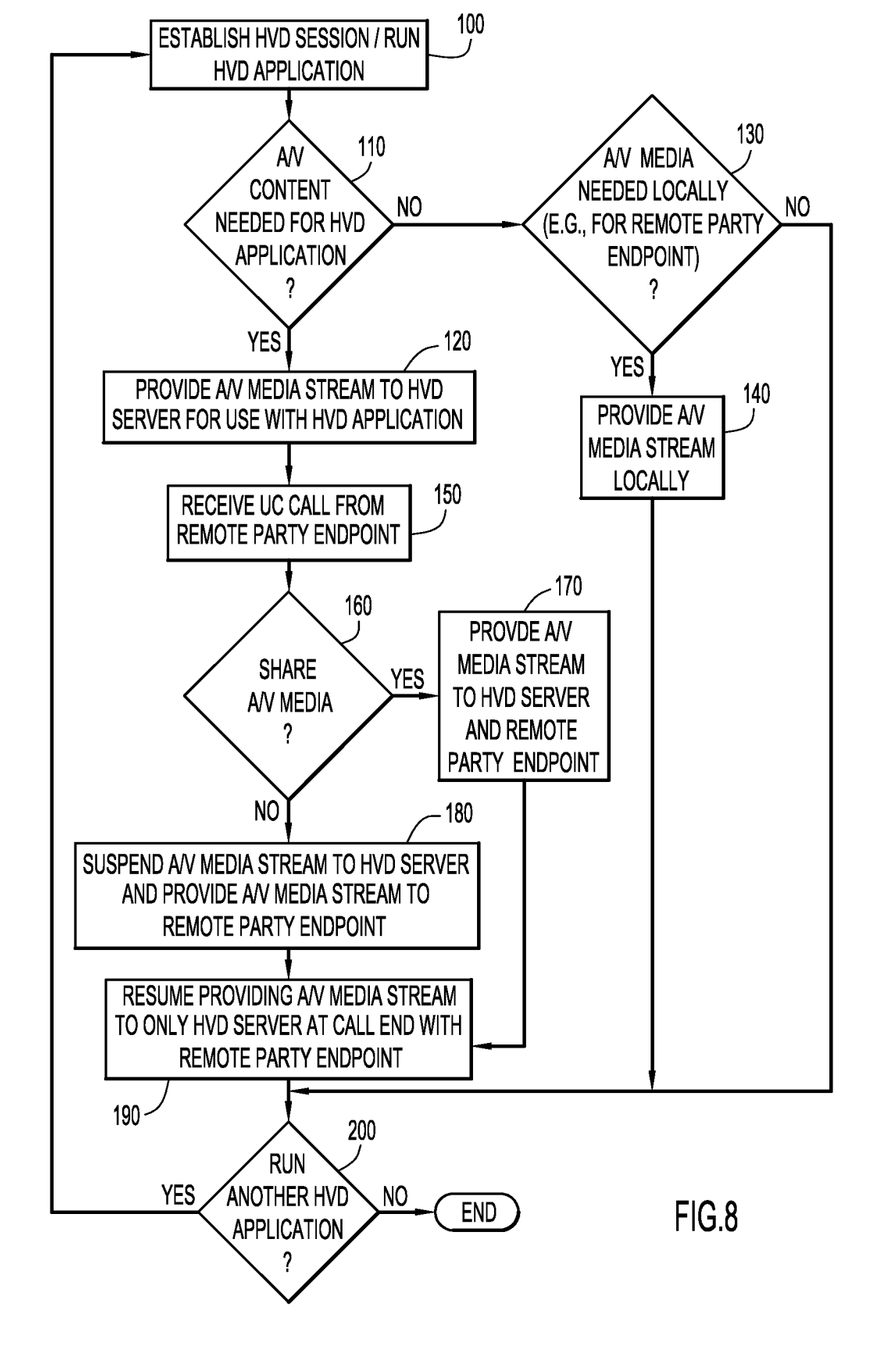
FIG. 8 is a flow chart depicted an example embodiment of interactions between the client device, the HVD server device during operation of the system as depicted in FIGS. 1-7.

Operation of the system 2 as depicted in FIGS. 1-3 and also the different scenarios depicted in FIGS. 4-7 is now described with reference to the flow chart of FIG. 8. At 100, an HVD session is established (or maintained) by connecting (or maintaining the connection of) the client device 6 with the host server device 20 via the network 4. An HVD application 28 can be selected from the HVD module 27 by a user of the client device 6, where the UC protocol stack 15 (e.g., utilizing display protocol application 18 and/or any other suitable applications) of the client VDI module 16 communicates with the HVD module 27 to control user selection and operation of HVD applications by the HVD module. At 110, it is determined whether the selected HVD application 28 requires audio and/or video content from the client device 6.

In response to the determination that the selected HVD application 28 needs audio and/or video content from the client device 6, the client device provides a media data stream including content that has been captured by its camera device 13 and audio input device 14 to the HVD module 27 of the host server device 20 for use by the HVD application 28 at 120. In particular, the VDI display agent 26 communicates with the display protocol application 18 indicating that media content is needed by the HVD application, the virtual camera and virtual audio devices 30, 32 of the server device 20 are activated, and the UC protocol stack 15 controls the camera 13 (and corresponding device driver) and audio input device 14 (can corresponding device driver) to capture and transmit a media data stream (e.g., an RTP data stream) comprising audio and/or video content to the virtual camera and audio devices controlled by the HVD module 27 so as to facilitate use of the media content by the running HVD application 28 (e.g., as depicted in FIG. 4).

At 130 (and in response to the determination that the HVD application does not need a media stream from the client device 6), a determination is made whether a media stream including audio and/or video content from the client device 6 is needed for one or more local applications. At 140, the media data stream comprising audio and/or video content is provided for use by the local applications. For example, the client device 6 may receive an incoming call from a remote party device 40 (e.g., as depicted in FIG. 5). In this scenario, the UC protocol stack 15 controls operations of the camera and/or audio input drivers at the client device 6 to transmit a media data stream to the remote party device 40 during the call. In another example embodiment, an application local to the client device 6 may require audio and/or video content from one or both of the camera/audio input devices 13, 14, and these devices would then be used to provide such content as needed to the local application being run by the client device 6.

At 150, a UC call is received from a remote party device 40 while the UC protocol stack 15 controls operation of the camera and audio input device drivers and transmission of a media content stream to the virtual camera 30 and/or virtual audio device 32 of the HVD module 27 for use by HVD application 28. The call is processed by the UC protocol stack 15 to establish a connection and communication between the client device 6 and the remote party device 40. At 160, a determination is made regarding whether to share the media stream from the client device 6 with both the host server device 20 and the remote party device 40. The decision regarding whether to share the media content can be made, e.g., based upon a protocol that establishes priority of whether to share (and if not, which application has priority for receiving media content) based upon a number of criteria including, without limitation, whether the applications need the same media content (e.g., both the host server device 20 and the remote party device 40 needs media streams from the client device for the same or similar applications, such engaging in the same video conferencing session), whether one application has a designated priority over another, current bandwidth capacity associated with the client device 6 and/or any other suitable criteria. The decision is further made locally via the UC protocol stack 15 and/or the client VDI module 16.

At 170, in response to a determination that the media stream can be shared, the UC protocol stack 15 controls the media stream originating at the client device 6 by forking or splitting the media stream so as to simultaneously transmit the audio and/or video content from media stream to the HVD application module 27 for use by the HVD application 28 and also the remote party device 40 (e.g., for use during the call session with the client device). This scenario is depicted in FIG. 6.

At 180, in response to a determination that the media stream cannot be shared and that the UC call takes priority over the HVD application 29 for receiving audio and/or video content from the client device 6, the UC protocol stack 15 diverts transmission of the media stream to the remote party device 40 as depicted in FIG. 7. During the call between the client device and remote party device, the display protocol application 18 (which is controlled by the UC protocol stack 15) communicates with the VDI agent 26 to provide an indication that transmission of media content from the UC protocol stack 15 to the virtual camera 30 and/or virtual audio device 32 has been disrupted or suspended (for at least the duration of the UC call between the client device 6 and the remote party device 40).

During the period of pause or suspension of transmission of the media content from the client device 6 to the host server device 20, the HVD application can provide its own audio and/or video content (shown generally as content 36 in FIG. 7) during operation that indicates the media content from the client device 6 has been temporarily suspended. In an example embodiment, during the period of suspended media content the HVD application 29 can operate to facilitate a static display (e.g., via a pop-up window within a user's display associated with the HVD application) or other form of communication indicating that the camera device 13 and/or audio input device 14 of the client device 6 is in use with another application or device or is temporarily unavailable. The virtual camera 30 and virtual audio device 32 can remain open or activated for use by the HVD application so as to resume receipt and processing of media content (thus resuming normal operation of the HVD application) when it becomes available again from the client device 6 (e.g., after the UC call is terminated) At 190, after termination of the UC call between the client device and the remote party device 40, transmission of the media data stream including audio and/or video content from the client device 6 to the host server device 20 is resumed. The process of suspension and resuming transmission of the media data stream is made seamless at the host server side, since the HVD application and virtual camera and audio devices are not changed (e.g., not deactivated) in any manner during the suspension and redirecting of the media stream to another source.

At 200, in the event another HVD application is to be run or activated at the HVD application module 27, the process is repeated at 100.

In another example embodiment, the system can be monitored (e.g., automatically or manually by a system administrator) to selectively control video formats and data flow rates or bit rates of media streams from client devices to a host server over the network. In particular, at different operation time periods, it may be determined that a media stream should be provided at a lower bitrate (e.g., due to bandwidth congestion and/or other network issues, an increase in processing operations at a host server, etc.). This can be achieved by a client device providing video from a media stream at a lower resolution. For example, the camera device 13 at a client 6 can be configured as a high definition (HD) camera that captures and provides HD video images (e.g., for display at 1280×720 pixels (720p) or 1920×1080 pixels (1080i or 1080p)) within the media streams to be used by HVD applications at the host server device 20. A higher bitrate is required for providing HD video content in comparison to standard definition (SD) video content or video content at lower resolutions.

At a given time period in which a lower bitrate is desired for providing media streams from a client device 6 to a host server device 20, the VDI agent 26 of the HVD module 27 for the host server device 20 provides a message to the display protocol application 18 that video content within the media stream must be provided at a lower resolution from camera device 13 (e.g., switching from HD to SD video content). The message can be sent automatically (e.g., based upon certain monitored criteria, such as available bandwidth diminishing below a threshold value, processing capacity of the host server device dropping below a threshold value, etc.) or provided manually by a system operator (e.g., an administrator at the host server device). The UC protocol stack 15 controls the camera device driver such that the camera device 13 captures and provides video content at the lower resolution. At a subsequent time period (e.g., when there is no longer bandwidth congestion, or the processing operations of the host server device have sufficiently diminished), the host server device 20, via the VDI agent 26, can then provide a message to the UC protocol stack 15 of the client device 6 to control the camera device 13 so as to increase the resolution (e.g., switch from providing SD video content back to HD video content). During the period in which video content is being provided from the client device 6 to the host server device 20 at the reduced resolution, the HVD module 27 of the host server device can scale up or upconvert the video content from the media stream (e.g., upconvert from SD video content to HD video content) so as to resemble video content at the higher resolution for use by the virtual camera 30 and also the HVD application 28 that utilize the media stream. Thus, the virtual camera 30 at the host server end is unaware of changing resolutions due to the upscaling or upconverting (converting) of the video content by the HVD module 27.

Thus, the techniques and embodiments described herein facilitate control in a UC environment of the camera and audio input devices at a client device by the UC protocol stack of the client device so as to allow the client device to selectively share or divert media streams generated by the camera and audio input devices to one or more end point devices, including server devices that host HVD applications and remote party devices engaging in a UC call with the client device. The camera and audio input devices are not rendered non-usable at the client device when an HVD application is running that uses media content from the client device and a UC call is simultaneously requested with the client device by another/third party device. Providing control (via the UC protocol stack) at the client device allows a decision to be made by the client device whether to simultaneously share the media stream with multiple end point devices or, alternatively, select which end point device may have priority at any given time for receiving media content from the client device.

The above description is intended by way of example only.

What is claimed is:

1. A method comprising:
   establishing a communication between a client device and a server device that executes one or more hosted virtual desktop (HVD) applications for the client device;
   transmitting a media data stream comprising at least one of audio content and video content from the client device to the server device, wherein audio and video content of the media data stream is captured by one or more input devices at the client device and is utilized by an HVD application at the server device;

in response to a request for the media data stream by a remote device, selectively suspending transmission of the media data stream to the server device to facilitate the client device engaging in a communication session with the remote device and providing the media data stream to the remote device for use by the remote device; and in response to terminating the communication session between the client device and the remote device, resuming transmission of the media data stream to the server device.

2. The method of claim 1, wherein the server device includes a virtual camera and a virtual audio input device, and the method further comprises:

encoding the media data stream prior to transmission to the server device; and decoding the encoded media data stream at the server device for use by at least one of the virtual camera and the virtual audio input device, wherein at least one of the virtual camera and the virtual audio input device is activated during transmission of the media data stream to the server device so as to provide content from the media data stream for use by the HVD application.

3. The method of claim 2, wherein the client device includes a camera to capture the video content, and the encoding the media data stream prior to transmission to the server device comprises:

encoding the video content at the camera.

4. The method of claim 1, further comprising:

in response to a request from the server device, reducing a resolution of the video content captured at the client device from an original resolution to a reduced resolution; and transmitting the media data stream including the video content at the reduced resolution from the client device to the server device.

5. The method of claim 4, further comprising:

upconverting the video content at the reduced resolution to a higher resolution at the server device for use by the HVD application at the server device.

6. A method comprising:

establishing a communication between a client device and a server device that executes one or more hosted virtual desktop (HVD) applications for the client device, wherein the server device includes a virtual camera and a virtual audio input device;

transmitting a media data stream comprising at least one of audio content and video content from the client device to the server device, wherein audio and video content of the media data stream is captured by one or more input devices at the client device and is utilized by an HVD application at the server device, and at least one of the virtual camera and the virtual audio input device is activated during transmission of the media data stream to the server device so as to provide content from the media data stream for use by the HVD application;

in response to a request for the media data stream by a second application that is local to the client device or is operating at a remote device, selectively suspending transmission of the media data stream to the server device or sharing the transmission of the media data stream with the second application; and in response to suspending transmission of the media data stream from the client device to the server device, providing alternative content for use by the HVD application;

wherein the at least one of the virtual camera and the virtual audio input device remains activated during suspension of transmission of the media data stream to the server device.

7. The method of claim 6, wherein the alternative content comprises video content including a message indicating that content from the client device is temporarily unavailable.

8. The method of claim 6, wherein selectively suspending or sharing comprises:

splitting the media data stream into a plurality of media data streams for use by the HVD application at the server device and the second application.

9. An apparatus comprising:

a memory configured to store a virtual desktop interface (VDI), the VDI comprising instructions to interact with a server device that executes hosted virtual desktop (HVD) for use by the apparatus;

one or more input devices that capture at least one of audio content and video content at the apparatus; and a processor configured to execute and control operations of the VDI so as to:

establish a communication between the VDI of the apparatus and one or more HVD applications of the server device so as to facilitate control of the one or more HVD applications by the apparatus utilizing the VDI;

transmit to the server device a media data stream comprising at least one of audio content and video content captured by the one or more input devices, wherein the media data is utilized by an HVD application at the server device;

in response to a request for the media data stream by a remote device, selectively suspend transmission of the media data stream to the server device to facilitate the apparatus engaging in a communication session with the remote device and providing the media data stream to the remote device for use by the remote device; and in response to terminating the communication session between the apparatus and the remote device, resuming transmission of the media data stream to the server device.

10. The apparatus of claim 9, wherein the one or more input devices comprises a camera to capture and encode the video content for delivery within the media data stream to the server device.

11. The apparatus of claim 9, wherein the processor is further configured to execute and control operations of the VDI so as to:

encode the media data stream prior to transmission to the server device; and provide the encoded media data stream to at least one of a virtual camera and a virtual audio input device of the server device, wherein the encoded media data stream is decoded at the server device for use by the at least one of the virtual camera and the virtual audio input device to provide content from the media data stream for use by the HVD application.

12. The apparatus of claim 9, wherein the processor is further configured to execute and control operations of the VDI so as to:

in response to a request from the server device, reduce a resolution of the video content captured by the one or more input devices from an original resolution to a reduced resolution; and transmit the media data stream including the video content at the reduced resolution to the server device.

13. One or more computer readable storage devices encoded with software comprising computer executable instructions and when the software is executed operable to:

establish a communication between a client device and a server device that executes one or more hosted virtual desktop (HVD) applications for the client device;

transmit a media data stream comprising at least one of audio content and video content from the client device to the server device, wherein audio content and video content of the media data stream is captured by one or more input devices at the client device and is utilized by an HVD application at the server device;

in response to a request for the media data stream by a remote device, selectively suspend transmission of the media data stream to the server device to facilitate the client device engaging in a communication session with the remote device and providing the media data stream to the remote device for use by the remote device; and in response to terminating the communication session between the client device and the remote device, resume transmission of the media data stream to the server device.

14. The one or more computer readable storage media devices of claim 13, and further comprising instructions that are operable to:

encode the media data stream prior to transmission to the server device; and decode the encoded media data stream at the server device for use by at least one of the virtual camera and the virtual audio input device, wherein at least one of the virtual camera and the virtual audio input device is activated during transmission of the media data stream to the server device so as to provide content from the media data stream for use by the HVD application.

15. The one or more computer readable storage media devices of claim 14, and further comprising instructions that are operable to:

in response to suspending transmission of the media data stream from the client device to the server device, provide alternative content for use by the HVD application;

wherein the instructions are further operable to maintain activation of the at least one of the virtual camera and the virtual audio input device during suspension of transmission of the media data stream to the server device.

16. The one or more computer readable storage media devices of claim 15, wherein the instructions are further operable to provide the alternative content comprising video content including a message indicating that content from the client device is temporarily unavailable.

17. The one or more computer readable storage media devices of claim 13, and further comprising instructions that are operable to:

in response to a request from the server device, reduce a resolution of the video content captured at the client device from an original resolution to a reduced resolution; and transmit the media data stream including the video content at the reduced resolution to the server device.

18. The one or more computer readable storage media devices of claim 17, and further comprising instructions that are operable to:

upconvert the video content at the reduced resolution to a higher resolution at the server device for use by the HVD application at the server device.

19. An apparatus comprising:

a memory configured to store a virtual desktop interface (VDI), the VDI comprising instructions to interact with a server device that executes hosted virtual desktop (HVD) for use by the apparatus;

one or more input devices that capture at least one of audio content and video content at the apparatus; and a processor configured to execute and control operations of the VDI so as to:

establish a communication between the VDI of the apparatus and one or more HVD applications of the server device so as to facilitate control of the one or more HVD applications by the apparatus utilizing the VDI, wherein the server device includes a virtual camera and a virtual audio input device;

transmit to the server device a media data stream comprising at least one of audio content and video content captured by the one or more input devices, wherein the media data is utilized by an HVD application at the server device, and at least one of the virtual camera and the virtual audio input device is activated during transmission of the media data stream to the server device so as to provide content from the media data stream for use by the HVD application;

in response to a request for the media data stream by a second application that is local to the apparatus or is operating at a remote device, selectively suspend transmission of the media data stream to the server device or share the transmission of the media data stream with the second application; and in response to suspending transmission of the media data stream from the apparatus to the server device, providing alternative content for use by the HVD application;

wherein the at least one of the virtual camera and the virtual audio input device remains activated during suspension of transmission of the media data stream to the server device.

20. The apparatus of claim 19, wherein the processor is further configured to execute and control operations of the VDI so as to:

suspend transmission of the media data stream to the server device in response to the client device providing the media data stream to a remote device for use by the second application operating at the remote device; and provide notification to the server device indicating suspension of the transmission of the media data stream, wherein the server device provides alternative content for use by the HVD application in response to receiving the notification from the apparatus.

21. The apparatus of claim 19, wherein the processor is further configured to execute and control operations of the VDI so as to:

in response to a request for the media data stream by the second application that is local to the apparatus or is operating at a remote device, split the media data stream into a plurality of media data streams for use by the HVD application at the server device and the second application.

22. One or more computer readable storage devices encoded with software comprising computer executable instructions and when the software is executed operable to:

establish a communication between a client device and a server device that executes one or more hosted virtual desktop (HVD) applications for the client device, wherein the server device includes a virtual camera and a virtual audio input device;

transmit a media data stream comprising at least one of audio content and video content from the client device to the server device, wherein audio content and video content of the media data stream is captured by one or more input devices at the client device and is utilized by an HVD application at the server device, and at least one of the virtual camera and the virtual audio input device is activated during transmission of the media data stream to the server device so as to provide content from the media data stream for use by the HVD application;

in response to a request for the media data stream by a second application that is local to the client device or is operating at a remote device, selectively suspend transmission of the media data stream to the server device or share the transmission of the media data stream with the second application; and in response to suspending transmission of the media data stream from the client device to the server device, provide alternative content for use by the HVD application;

wherein the at least one of the virtual camera and the virtual audio input device remains activated during suspension of transmission of the media data stream to the server device.

23. The one or more computer readable storage media devices of claim 22, wherein the second application is at the remote device, and further comprising instructions that are operable to:

split the media data stream into a plurality of media data streams for use by the HVD application at the server device and the second application at the remote device.

* * * * *